(12) United States Patent
Kingsley

(10) Patent No.: US 6,739,311 B1
(45) Date of Patent: May 25, 2004

(54) THEFT PREVENTION DEVICE

(76) Inventor: Merari Kingsley, 730 W. Union St. Apt #1, Allentown, PA (US) 18101

( * ) Notice: Subject to any disclaimer, the term of this patent is extended or adjusted under 35 U.S.C. 154(b) by 89 days.

(21) Appl. No.: 10/164,779

(22) Filed: Jun. 7, 2002

(51) Int. Cl.[7] .............................. B60R 25/00; F02D 9/06
(52) U.S. Cl. .................. 123/323; 137/630.12; 180/287; 307/10.2; 123/198 B
(58) Field of Search .............................. 123/323, 198 B, 123/334, 335; 251/129.15; 307/10.2, 10.3, 10.4; 180/287; 137/630.12

(56) References Cited

U.S. PATENT DOCUMENTS

| | | | |
|---|---|---|---|
| 1,282,067 A | | 10/1918 | Gohring |
| 4,063,610 A | * | 12/1977 | Shilling ..................... 307/10.3 |
| D278,079 S | | 3/1985 | Widerby |
| 4,690,240 A | | 9/1987 | Russo |
| 4,751,987 A | * | 6/1988 | Takigawa et al. ............ 188/273 |
| 4,819,696 A | * | 4/1989 | Takikawa et al. ....... 137/630.12 |
| 5,052,204 A | | 10/1991 | Millar |
| 5,249,442 A | | 10/1993 | Wright |
| 5,612,878 A | | 3/1997 | Joao et al. |
| 5,917,406 A | * | 6/1999 | Postel .................... 340/426.12 |
| 6,109,027 A | * | 8/2000 | Schaefer ...................... 60/324 |

* cited by examiner

*Primary Examiner*—Mahmoud Gimie
*Assistant Examiner*—Arnold Castro

(57) ABSTRACT

A theft prevention device for inhibiting expulsion of gases from the exhaust of the vehicle to stall to the motor of the vehicle. The theft prevention device includes a housing being designed for coupling to an exhaust system of the vehicle whereby the housing is for permitting exhaust to selectively pass through the housing. A valve assembly is positioned in the housing. The valve assembly is designed for selectively restricting flow of exhaust from a motor of the vehicle to a muffler of the vehicle for stalling the motor of the vehicle when the valve assembly restricts flow of the exhaust from the motor of the vehicle.

20 Claims, 4 Drawing Sheets

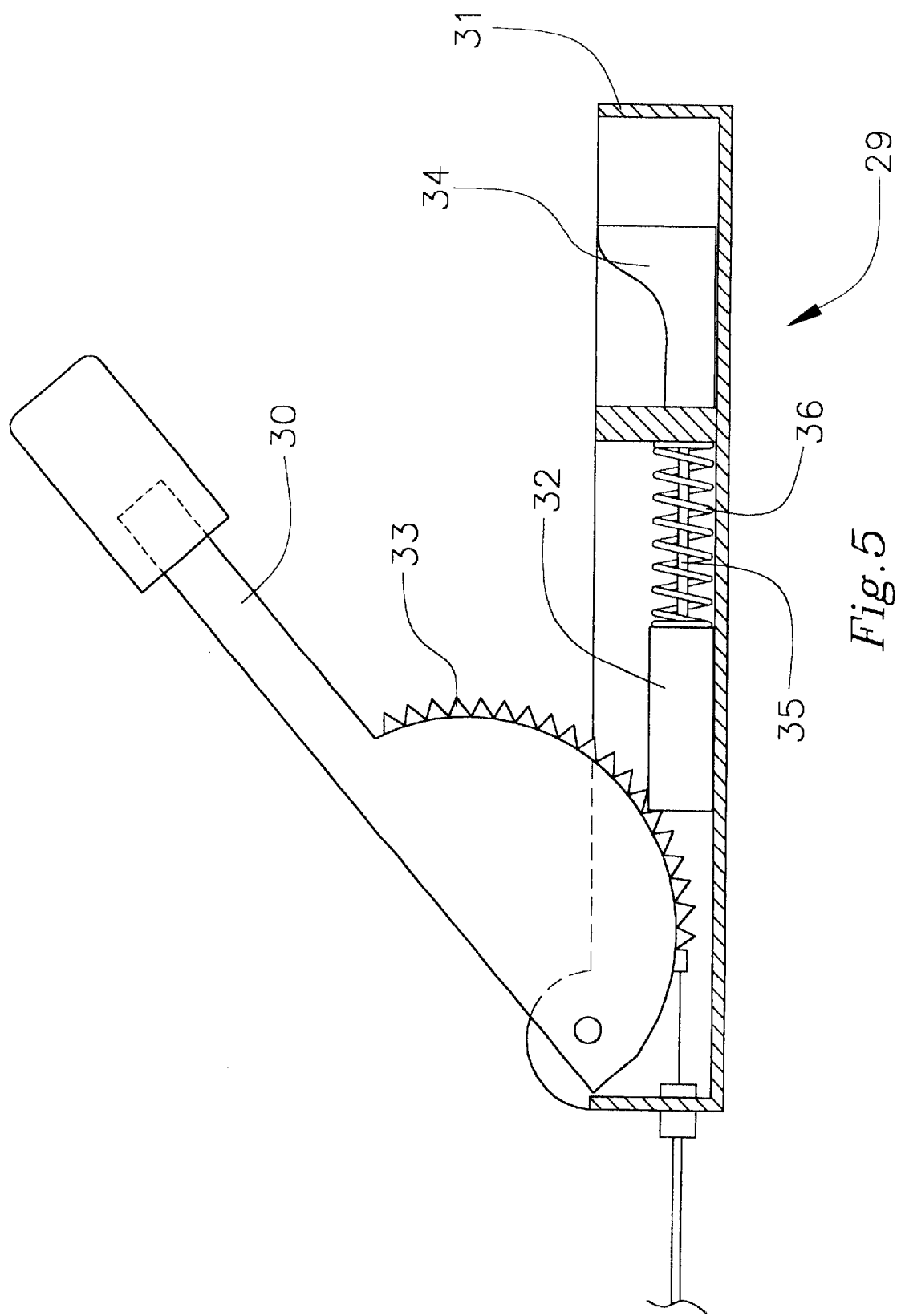

THEFT PREVENTION DEVICE

BACKGROUND OF THE INVENTION

1. Field of the Invention

The present invention relates to anti-theft exhaust systems and more particularly pertains to a new theft prevention device for inhibiting expulsion of gases from the exhaust of the vehicle to stall to the motor of the vehicle.

2. Description of the Prior Art

The use of anti-theft exhaust systems is known in the prior art. U.S. Pat. No. 4,690,240 describes a device for closing sealing the exhaust system of the vehicle to prevent normal operation of the vehicle. Another type of anti-theft exhaust systems is U.S. Pat. No. 5,612,878 having an apparatus from blocking the exhaust of the vehicle to inhibit proper operation of the motor of the vehicle. U.S. Pat. No. 1,282,067 has a butterfly valve positioned in the exhaust pipe of the vehicle that is closable by the user to inhibit proper operation of the motor of the vehicle. U.S. Pat. No. 5,249,442 has a lock having a plug for positioning in the exhaust pipe of vehicle to prevent proper operation of the motor of the vehicle. U.S. Pat. No. 5,052,204 has a valve positioned in the air inlet, fuel inlet or exhaust inlet for impeding proper operation of the motor of the vehicle when the valve is locked by the user. U.S. Des. Pat. No. 278,079 shows a exhaust air valve.

While these devices fulfill their respective, particular objectives and requirements, the need remains for a device that has certain improved features that allows for a fail safe system to allow for alternate method of shutting down the motor should the back pressure of the motor fail to shut down the motor.

SUMMARY OF THE INVENTION

The present invention meets the needs presented above by providing a relief valve assembly that will initiate a disruption of the ignition system to shut down the vehicle should the back pressure continue to build and fail to shut down the motor.

Still yet another object of the present invention is to provide a new theft prevention device that an override assembly that allows the user to force the closure member to remain in the exhaust path.

To this end, the present invention generally comprises a housing being designed for coupling to an exhaust system of the vehicle whereby the housing is for permitting exhaust to selectively pass through the housing. A valve assembly is positioned in the housing. The valve assembly is designed for selectively restricting flow of exhaust from a motor of the vehicle to a muffler of the vehicle for stalling the motor of the vehicle when the valve assembly restricts flow of the exhaust from the motor of the vehicle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a cross-sectional view of the override assembly of the present invention.

DESCRIPTION OF THE PREFERRED EMBODIMENT

Figure 1:
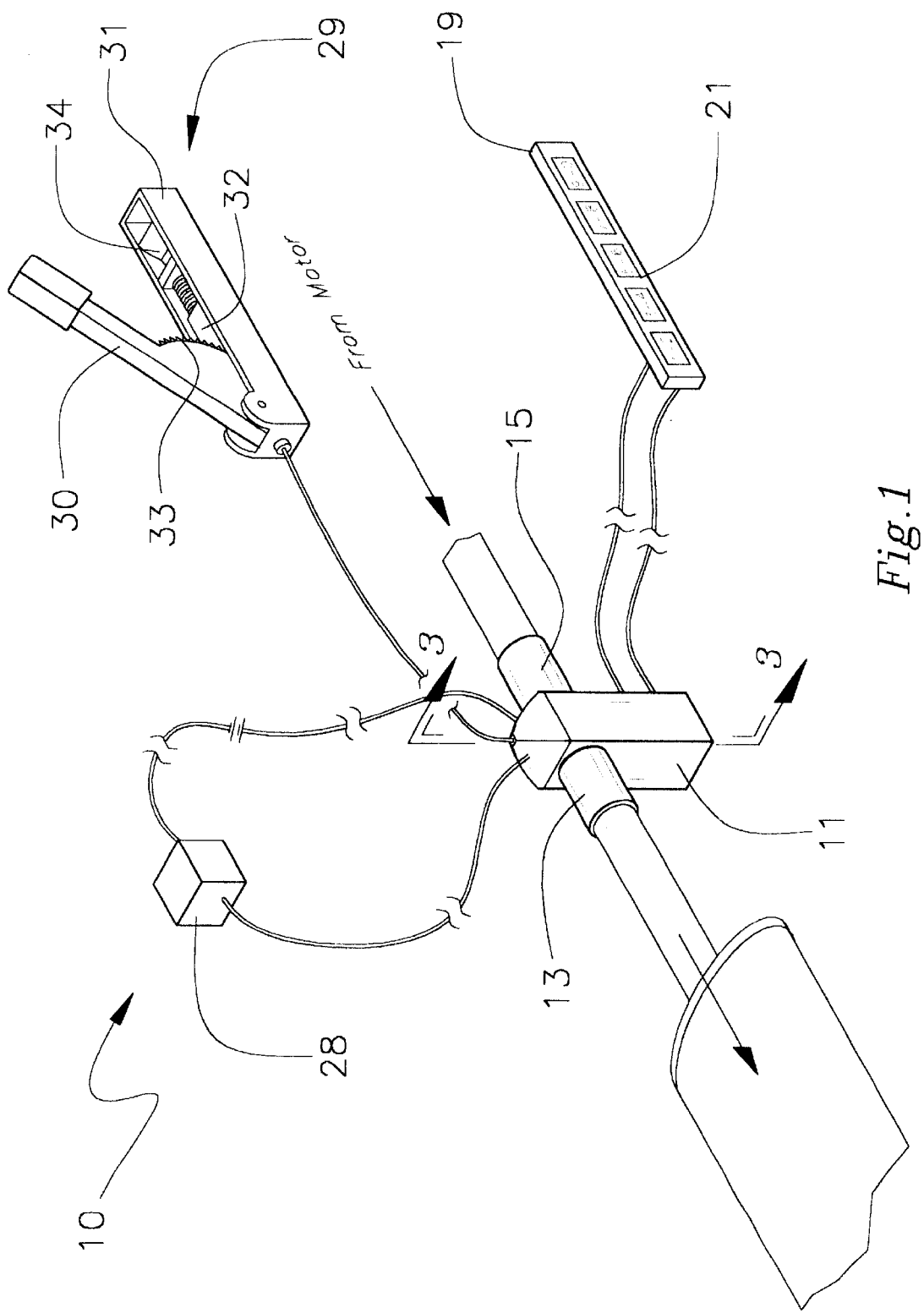
FIG. 1 is a perspective view of a new theft prevention device according to the present invention.
Figure 2:
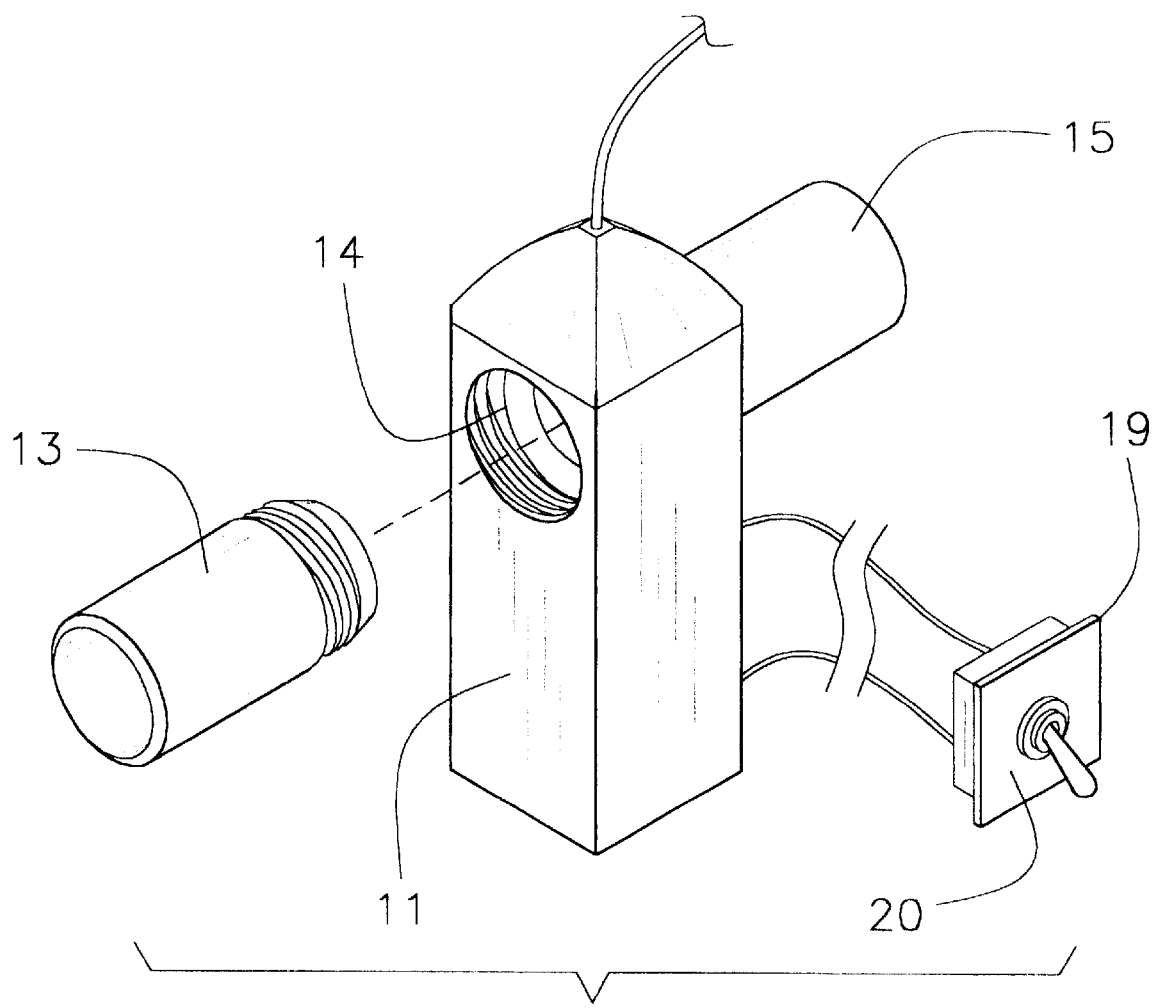
FIG. 2 is an enlarged perspective view of the housing of the present invention.
Figure 3:
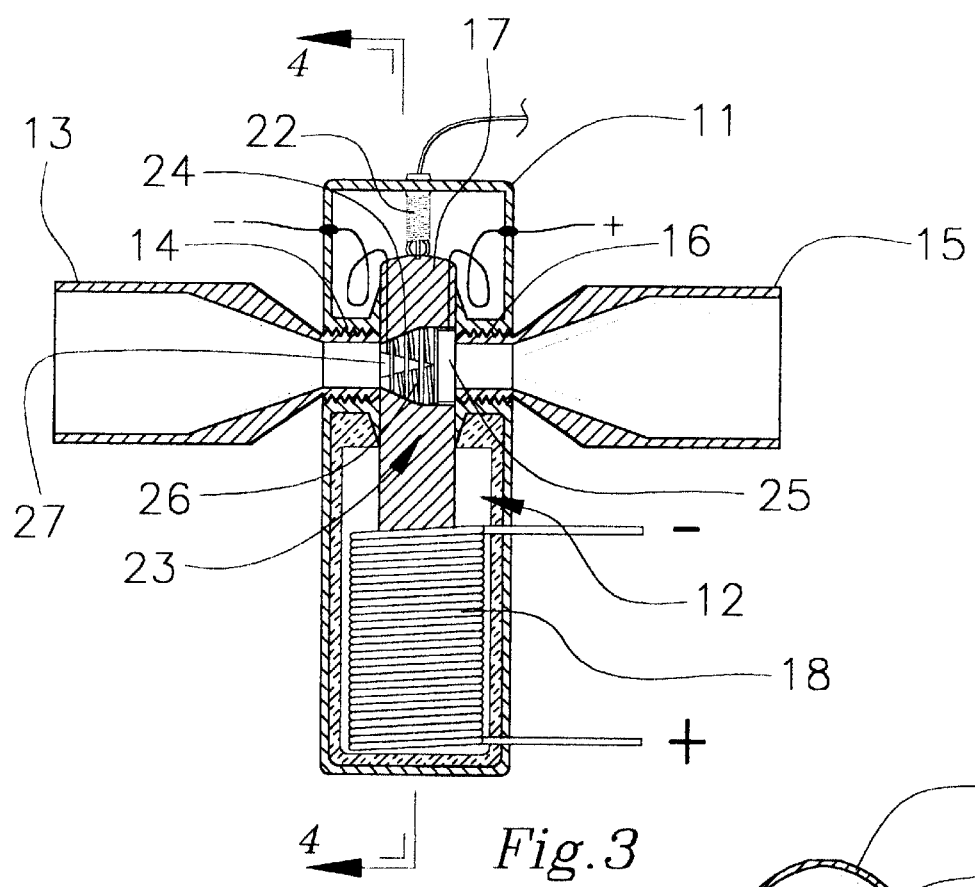
FIG. 3 is a cross-sectional view of the present invention taken along line 3—3 of FIG. 1.
Figure 4:
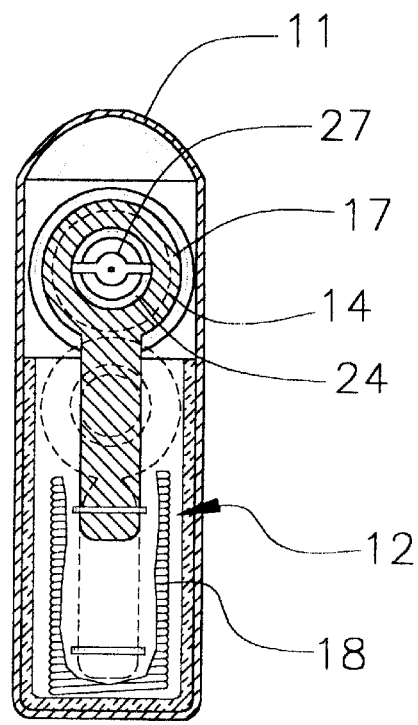
FIG. 4 is a cross-sectional view of the present invention taken along line 4—4 of FIG. 3.

With reference now to the drawings, and in particular to FIGS. 1 through 5 thereof, a new theft prevention device embodying the principles and concepts of the present invention and generally designated by the reference numeral 10 will be described.

As best illustrated in FIGS. 1 through 5, the theft prevention device 10 generally comprises a housing 11 being designed for coupling to an exhaust system of the vehicle whereby the housing 11 is for permitting exhaust to selectively pass through the housing 11.

A valve assembly 12 is positioned in the housing 11. The valve assembly 12 is designed for selectively restricting flow of exhaust from a motor of the vehicle to a muffler of the vehicle for stalling the motor of the vehicle when the valve assembly 12 restricts flow of the exhaust from the motor of the vehicle. The theft prevention device can be used as a backup to an intake restriction device that inhibits air intake into the engine to facilitating flooding of the motor which could easily be disarmed by a thief.

An outlet member 13 is selectively couplable to an outlet port 14 the housing 11. The outlet member 13 is designed for coupling to an inlet exhaust pipe of the muffler whereby the outlet member 13 is disengagable from the housing 11 when the muffler is to be replaced.

An inlet member 15 is selectively couplable to an inlet port 16 of the housing 11. The inlet member 15 is designed for coupling to an outlet exhaust pipe from the motor whereby the inlet member 15 is disengagable from the housing 11 when the housing 11 is to be replaced.

The valve assembly 12 has a closure member 17. The closure member 17 is positioned within the housing 11 whereby the closure member 17 is designed for being selectively positioned in the exhaust path of the exhaust system from the motor. The closure member 17 is designed for inhibiting of exhausting of gases from the motor of the vehicle to build up back pressure in the motor to facilitate shutdown of the motor when the closure member 17 is positioned in the exhaust path of the vehicle.

The valve assembly 12 has a solenoid 18. The solenoid 18 is positioned in the housing 11. The solenoid 18 is operationally coupled to the closure member 17. The solenoid 18 is designed for drawing the closure member 17 out of the exhaust path to allow normal operation of the motor when the solenoid 18 is energized.

A switching means 19 is for controlling power to the solenoid 18. The switching means 19 is designed for being operationally coupled between the solenoid 18 and a power supply of the vehicle whereby the switching means 19 is actuatable by a user to control power to the solenoid 18. The switching means 19 could comprise a toggle switch 20 or a keypad 21 requiring the user to enter a series of numbers to energize the solenoid 18.

The valve assembly 12 has a closure biasing member 36 22. The closure biasing member 36 22 is coupled between the housing 11 and the closure member 17. The closure biasing member 36 22 is for biasing the closure member 17 into the exhaust path when the closure member 17 is not is retracted by the solenoid 18.

The valve assembly 12 has a relief valve assembly 23 being positioned in an aperture 24 extending through the closure member 17 of the valve assembly 12. The relief valve assembly 23 is designed for bleeding off excessive back pressure formed when the closure member 17 is positioned in the exhaust path and the motor fails to shut down. The relief valve assembly 23 is designed for being operationally coupled to an ignition system of the vehicle whereby the ignition system of the vehicle is disrupted to shut down the motor when the relief valve assembly 23 bleeds off excessive back pressure formed by the motor.

The relief valve assembly 23 has a blocking member 25. The blocking member 25 is slidably positioned in the aperture 24 of the closure member 17. The blocking member 25 is designed for selectively preventing back pressure from the motor from escaping through the aperture 24 of the closure member 17.

The relief valve assembly 23 has a relief biasing member 36 26. The relief biasing member 36 26 is positioned in the aperture 24 of the closure member 17 whereby the relief biasing member 36 26 is positioned between the closure member 17 and the blocking member 25. The relief biasing member 36 26 is designed for biasing the blocking member 25 against a predetermined value of the back pressure developed by the motor whereby the relief biasing member 36 26 allows the blocking member 25 to move with respect to the aperture 24 of the closure member 17 when the back pressure exceeds the predetermined value to allow the exhaust to vent out to prevent damage to the motor.

The relief valve assembly 23 has a stopping member 27. The stopping member 27 is coupled to the closure member 17 whereby the stopping member 27 extends through a portion of a length of the aperture 24 of the closure member 17. The stop member is for selectively engaging the blocking member 25 when the blocking member 25 is moved by the back pressure produced by the motor of the vehicle. The blocking member 25 is designed for operationally coupling to the ignition system of the vehicle and the blocking member 25 is operationally coupled to a power supply of the vehicle whereby the blocking member 25 completes a circuit with the stopping member 27 when the blocking member 25 engages the stopping member 27 for energizing a relay 28 of the ignition system of the vehicle for disconnecting the ignition system from the motor to shut down the engine.

An override assembly 29 is coupled to the closure member 17. The override assembly 29 is for selectively retaining the closure member 17 in the exhaust path of the vehicle when the override assembly 29 is actuated by the user.

The override assembly 29 has a handle member 30 and a base member 31. The handle member 30 is pivotably coupled to the base member 31. The base member 31 is designed for being positioned in a passenger compartment of the vehicle. The handle member 30 is operationally coupled to the closure member 17 of the valve assembly 12 whereby pivoting of the handle member 30 away from the base member 31 draws the closure member 17 into the exhaust path to create back pressure in the motor of the vehicle when the handle member 30 is actuated by the user.

The override assembly 29 has an engaging member 32. The engaging member 32 is slidably positioned in the base member 31. The engaging member 32 selectively engages one of a plurality of teeth 33 of the handle member 30 whereby the engaging member 32 is for retaining said handle member 30 in a position when the handle member 30 has been pivoted with respect to the base member 31.

The override assembly 29 has a return member 34. The return member 34 is slidably positioned in the base member 31. The return member 34 is coupled to the engaging member 32 by a rod member 35. The return member 34 is designed for being engaged by the user for sliding the engaging member 32 away from the teeth 33 of the handle member 30 to allow the handle member 30 to be pivoted towards the base member 31 and The override assembly 29 has an override biasing member 36. The biasing member 36 is positioned between the engaging member 32 opposite the teeth 33 of the handle member 30 and the base member 31. The biasing member 36 is for biasing the engaging member 32 against the teeth 33 of the handle member 30.

In use, the user installs the housing 11 in the exhaust pipe between the motor and the muffler. The base member 31 of the override assembly 29 is concealed in the passenger compartment of the vehicle. The switch means is also concealed in the passenger compartment so that the switch means and the override assembly 29 are not easily noticed by a thief. The user must actuate the switch means upon entering the vehicle to energize the solenoid 18 to draw the closure member 17 out of the exhaust path to allow for normal operation of the vehicle. The user can, if necessary, pivot the handle member 30 of the override assembly 29 away from the base member 31 to raise the closure member 17 into the exhaust path to start building back pressure in the motor should the thief steal the vehicle with the handle member 30 in a raised position. Should the motor fail to shut down, the relief valve assembly 23 would disrupt the ignition system to shut down the motor and protect the engine from damage.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A theft prevention device for inhibiting theft of a vehicle, the theft prevention device comprising:

a housing being adapted for coupling to an exhaust system of the vehicle such that said housing is for permitting exhaust to selectively pass through the housing;

a valve assembly being positioned in said housing, said valve assembly being adapted for selectively restricting flow of exhaust from a motor of the vehicle to a muffler of the vehicle for stalling the motor of the vehicle when said valve assembly restricts flow of the exhaust from the motor of the vehicle;

said valve assembly having a closure member, said closure member being positioned within said housing such that said closure member is adapted for being selectively positioned in the exhaust path of the exhaust system from the motor, said closure member being adapted for inhibiting of exhausting of gases from the motor of the vehicle to build up back pressure in the motor to facilitate shutdown of the motor when said closure member is positioned in the exhaust path of the vehicle; and said valve assembly having a relief valve assembly being positioned in an aperture extending through said closure member of said valve assembly, said relief valve assembly being adapted for bleeding off excessive back pressure formed when said closure member is positioned in the exhaust path and the motor fails to shut down, said relief valve assembly being adapted for being operationally coupled to an ignition system of the vehicle such that the ignition system of the vehicle is disrupted to shut down the motor when said relief valve assembly bleeds off excessive back pressure formed by the motor.

2. The theft prevention device as set forth in claim 1, further comprising:

an outlet member being couplable to an outlet port of said housing, said outlet member being adapted for coupling to an inlet exhaust pipe of the muffler such that said outlet member is disengagable from said housing when the muffler is to be replaced.

3. The theft prevention device as set forth in claim 1, further comprising:

an inlet member being couplable to an inlet port of said housing, said inlet member being adapted for coupling to an outlet exhaust pipe from the motor such that said inlet member is disengagable from said housing when said housing is to be replaced.

4. The theft prevention device as set forth in claim 1, further comprising:

said valve assembly having a solenoid, said solenoid being positioned in said housing, said solenoid being operationally coupled to said closure member, said solenoid being adapted for drawing said closure member out of the exhaust path to allow normal operation of the motor when said solenoid is energized.

5. The theft prevention device as set forth in claim 4, further comprising:

a switching means for controlling power to said solenoid, said switching means being adapted for being operationally coupled between said solenoid and a power supply of the vehicle such that said switching means is actuatable by a user to control power to said solenoid.

6. The theft prevention device as set forth in claim 4, further comprising:

said valve assembly having a closure biasing member, said closure biasing member being coupled between said housing and said closure member, said closure biasing member being for biasing said closure member into the exhaust path when said closure member is not being retracted by said solenoid.

7. The theft prevention device as set forth in claim 1, further comprising:

said relief valve assembly having a blocking member, said blocking member being slidably positioned in said aperture of said closure member, said blocking member being adapted for selectively preventing back pressure from the motor from escaping through said aperture of said closure member; and said relief valve assembly having a relief biasing member, said relief biasing member being positioned in said aperture of said closure member such that said relief biasing member is positioned between said closure member and said blocking member, said relief biasing member being adapted for biasing said blocking member against a predetermined value of the back pressure developed by the motor such that said relief biasing member allows said blocking member to move with respect to said aperture of said closure member when the back pressure exceeds the predetermined value to allow the exhaust to vent out to prevent damage to the motor.

8. The theft prevention device as set forth in claim 7, further comprising:

said relief valve assembly having a stopping member, said stopping member being coupled to said closure member such that said stopping member extends through a portion of a length of said aperture of said closure member, said stop member being for selectively engaging said blocking member when said blocking member is moved by the back pressure produced by the motor of the vehicle, said blocking member being adapted for operationally coupling to the ignition system of the vehicle and said blocking member being operationally coupled to a power supply of the vehicle such that said blocking member completes a circuit with said stopping member when said blocking member engages said stopping member for energizing a relay of the ignition system of the vehicle for disconnecting the ignition system from the motor to shut down the engine.

9. The theft prevention device as set forth in claim 1, further comprising:

an override assembly being coupled to said closure member, said override assembly being for selectively retaining said closure member in the exhaust path of the vehicle when said override assembly is actuated by the user.

10. The theft prevention device as set forth in claim 9, further comprising:

said override assembly having a handle member and a base member, said handle member being pivotably coupled to said base member, said base member being adapted for being positioned in a passenger compartment of the vehicle, said handle member being operationally coupled to said closure member of said valve assembly such that pivoting of said handle member away from said base member draws said closure member into the exhaust path to create back pressure in the motor of the vehicle when said handle member is actuated by the user.

11. The theft prevention device as set forth in claim 10, further comprising:

said override assembly having an engaging member, said engaging member being slidably positioned in said base member, said engaging member selectively engaging one of a plurality of teeth of said handle member such that said engaging member is for retaining said handle member in a position when said handle member has been pivoted with respect to said base member.

12. The theft prevention device as set forth in claim 11, further comprising:

said override assembly having a return member, said return member being slidably positioned in said base member, said return member being coupled to said engaging member by a rod member, said return member being adapted for being engaged by the user for sliding said engaging member away from the teeth of said handle member to allow said handle member to be pivoted towards said base member.

13. The theft prevention device as set forth in claim 11, further comprising:

said override assembly having an override biasing member, said biasing member being positioned between said engaging member opposite said teeth of said handle member and said base member, said biasing member being for biasing said engaging member against said teeth of said handle member.

14. A theft prevention device for inhibiting theft of a vehicle, the theft prevention device comprising:

a housing being adapted for coupling to an exhaust system of the vehicle such that said housing is for permitting exhaust to selectively pass through the housing;

a valve assembly being positioned in said housing, said valve assembly being adapted for selectively restricting flow of exhaust from a motor of the vehicle to a muffler of the vehicle for stalling the motor of the vehicle when said valve assembly restricts flow of the exhaust from the motor of the vehicle;

an outlet member being couplable to an outlet port said housing, said outlet member being adapted for coupling to an inlet exhaust pipe of the muffler such that said outlet member is disengagable from said housing when the muffler is to be replaced;

an inlet member being couplable to an inlet port of said housing, said inlet member being adapted for coupling to an outlet exhaust pipe from the motor such that said inlet member is disengagable from said housing when said housing is to be replaced;

said valve assembly having a closure member, said closure member being positioned within said housing such that said closure member is adapted for being selectively positioned in the exhaust path of the exhaust system from the motor, said closure member being adapted for inhibiting of exhausting of gases from the motor of the vehicle to build up back pressure in the motor to facilitate shutdown of the motor when said closure member is positioned in the exhaust path of the vehicle;

said valve assembly having a solenoid, said solenoid being positioned in said housing, said solenoid being operationally coupled to said closure member, said solenoid being adapted for drawing said closure member out of the exhaust path to allow normal operation of the motor when said solenoid is energized;

a switching means for controlling power to said solenoid, said switching means being adapted for being operationally coupled between said solenoid and a power supply of the vehicle such that said switching means is actuatable by a user to control power to said solenoid;

said valve assembly having a closure biasing member, said closure biasing member being coupled between said housing and said closure member, said closure biasing member being for biasing said closure member into the exhaust path when said closure member is not being retracted by said solenoid;

said valve assembly having a relief valve assembly being positioned in an aperture extending through said closure member of said valve assembly, said relief valve assembly being adapted for bleeding off excessive back pressure formed when said closure member is positioned in the exhaust path and the motor fails to shut down, said relief valve assembly being adapted for being operationally coupled to an ignition system of the vehicle such that the ignition system of the vehicle is disrupted to shut down the motor when said relief valve assembly bleeds off excessive back pressure formed by the motor;

said relief valve assembly having a blocking member, said blocking member being slidably positioned in said aperture of said closure member, said blocking member being adapted for selectively preventing back pressure from the motor from escaping through said aperture of said closure member;

said relief valve assembly having a relief biasing member, said relief biasing member being positioned in said aperture of said closure member such that said relief biasing member is positioned between said closure member and said blocking member, said relief biasing member being adapted for biasing said blocking member against a predetermined value of the back pressure developed by the motor such that said relief biasing member allows said blocking member to move with respect to said aperture of said closure member when the back pressure exceeds the predetermined value to allow the exhaust to vent out to prevent damage to the motor;

said relief valve assembly having a stopping member, said stopping member being coupled to said closure member such that said stopping member extends through a portion of a length of said aperture of said closure member, said stop member being for selectively engaging said blocking member when said blocking member is moved by the back pressure produced by the motor of the vehicle, said blocking member being adapted for operationally coupling to the ignition system of the vehicle and said blocking member being operationally coupled to a power supply of the vehicle such that said blocking member completes a circuit with said stopping member when said blocking member engages said stopping member for energizing a relay of the ignition system of the vehicle for disconnecting the ignition system from the motor to shut down the engine;

an override assembly being coupled to said closure member, said override assembly being for selectively retaining said closure member in the exhaust path of the vehicle when said override assembly is actuated by the user;

said override assembly having a handle member and a base member, said handle member being pivotably coupled to said base member, said base member being adapted for being positioned in a passenger compartment of the vehicle, said handle member being operationally coupled to said closure member of said valve assembly such that pivoting of said handle member away from said base member draws said closure member into the exhaust path to create back pressure in the motor of the vehicle when said handle member is actuated by the user;

said override assembly having an engaging member, said engaging member being slidably positioned in said base member, said engaging member selectively engaging one of a plurality of teeth of said handle member such that said engaging member is for retaining said handle member in a position when said handle member has been pivoted with respect to said base member;

said override assembly having a return member, said return member being slidably positioned in said base member, said return member being coupled to said engaging member by a rod member, said return member being adapted for being engaged by the user for sliding said engaging member away from the teeth of said handle member to allow said handle member to be pivoted towards said base member; and said override assembly having an override biasing member, said biasing member being positioned between said engaging member opposite said teeth of said handle member and said base member, said biasing member being for biasing said engaging member against said teeth of said handle member.

15. A theft prevention device for inhibiting theft of a vehicle, the theft prevention device comprising:

a housing being adapted for coupling to an exhaust system of the vehicle such that said housing is for permitting exhaust to selectively pass through the housing;

a valve assembly being positioned in said housing, said valve assembly being adapted for selectively restricting flow of exhaust from a motor of the vehicle to a muffler of the vehicle for stalling the motor of the vehicle when said valve assembly restricts flow of the exhaust from the motor of the vehicle;

said valve assembly having a closure member, said closure member being positioned within said housing such that said closure member is adapted for being selectively positioned in the exhaust path of the exhaust system from the motor, said closure member being adapted for inhibiting of exhausting of gases from the motor of the vehicle to build up back pressure in the motor to facilitate shutdown of the motor when said closure member is positioned in the exhaust path of the vehicle;

an override assembly being coupled to said closure member, said override assembly being for selectively retaining said closure member in the exhaust path of the vehicle when said override assembly is actuated by the user; and said override assembly having a handle member and a base member, said handle member being pivotably coupled to said base member, said base member being adapted for being positioned in a passenger compartment of the vehicle, said handle member being operationally coupled to said closure member of said valve assembly such that pivoting of said handle member away from said base member draws said closure member into the exhaust path to create back pressure in the motor of the vehicle when said handle member is actuated by the user.

16. The theft prevention device as set forth in claim 15, further comprising:

an outlet member being couplable to an outlet port of said housing, said outlet member being adapted for coupling to an inlet exhaust pipe of the muffler such that said outlet member is disengagable from said housing when the muffler is to be replaced.

17. The theft prevention device as set forth in claim 15, further comprising:

an inlet member being couplable to an inlet port of said housing, said inlet member being adapted for coupling to an outlet exhaust pipe from the motor such that said inlet member is disengagable from said housing when said housing is to be replaced.

18. The theft prevention device as set forth in claim 15, further comprising:

said override assembly having an engaging member, said engaging member being slidably positioned in said base member, said engaging member selectively engaging one of a plurality of teeth of said handle member such that said engaging member is for retaining said handle member in a position when said handle member has been pivoted with respect to said base member.

19. The theft prevention device as set forth in claim 18, further comprising:

said override assembly having a return member, said return member being slidably positioned in said base member, said return member being coupled to said engaging member by a rod member, said return member being adapted for being engaged by the user for sliding said engaging member away from the teeth of said handle member to allow said handle member to be pivoted towards said base member.

20. The theft prevention device as set forth in claim 18, further comprising:

said override assembly having an override biasing member, said biasing member being positioned between said engaging member opposite said teeth of said handle member and said base member, said biasing member being for biasing said engaging member against said teeth of said handle member.

* * * * *